United States Patent
McCann

(10) Patent No.: US 11,936,808 B2
(45) Date of Patent: *Mar. 19, 2024

(54) MESSAGE ROUTING IN A CONTACT CENTER

(71) Applicant: Avaya Management L.P., Durham, NC (US)

(72) Inventor: Philip McCann, Galway (IE)

(73) Assignee: Avaya Management L.P., Durham, NC (US)

(*) Notice: Subject to any disclaimer, the term of this patent is extended or adjusted under 35 U.S.C. 154(b) by 128 days.

This patent is subject to a terminal disclaimer.

(21) Appl. No.: 17/328,559

(22) Filed: May 24, 2021

(65) Prior Publication Data

US 2021/0329126 A1    Oct. 21, 2021

Related U.S. Application Data

(63) Continuation of application No. 16/853,108, filed on Apr. 20, 2020, now Pat. No. 11,050,881.

(51) Int. Cl.
*H04M 3/42* (2006.01)
*G06F 40/30* (2020.01)
(Continued)

(52) U.S. Cl.
CPC ........ *H04M 3/42382* (2013.01); *G06F 40/30* (2020.01); *G06N 20/00* (2019.01);
(Continued)

(58) Field of Classification Search
CPC .......... H04M 3/42382; H04M 3/4365; H04M 3/5191; H04M 3/5233; G06F 40/30; G06N 20/00; G06N 20/20
See application file for complete search history.

(56) References Cited

U.S. PATENT DOCUMENTS

| 6,883,014 B1 | 4/2005 | McErlean |
| 11,050,881 B1 | 6/2021 | McCann |

(Continued)

OTHER PUBLICATIONS

"Apache SpamAssassin™," The Apache Software Foundation, accessed Aug. 2018, pages [retrieved online from: spamassassin.apache.org/index.html].

(Continued)

*Primary Examiner* — Marisol Figueroa
(74) *Attorney, Agent, or Firm* — Sheridan Ross P.C.

(57) ABSTRACT

The present disclosure provides, among other things, a method of managing contacts in a contact center, the method including: receiving a text-based communication from a customer of the contact center; analyzing the text-based communication to determine a relevancy associated with the text-based communication; based on the analysis, determining a relevancy level to assign to the text-based communication; tagging the text-based communication with a relevancy tag that identifies the determined relevancy level; updating a priority associated with assigning the text-based communication to an agent of the contact center based on the relevancy tag; assigning the text-based communication to the agent of the contact center; enabling a machine learning process to analyze a database of text-based communications; and updating a data model used to automatically tag text-based communications with relevancy tags based on the analysis performed by the machine learning process.

33 Claims, 6 Drawing Sheets

(51) Int. Cl.
    *G06N 20/00*     (2019.01)
    *H04M 3/436*     (2006.01)
    *H04M 3/51*     (2006.01)
    *H04M 3/523*     (2006.01)

(52) U.S. Cl.
    CPC ....... *H04M 3/4365* (2013.01); *H04M 3/5191* (2013.01); *H04M 3/5233* (2013.01)

(56) References Cited

U.S. PATENT DOCUMENTS

| | | | |
|---|---|---|---|
| 2005/0204001 A1 | 9/2005 | Stein et al. | |
| 2007/0100950 A1* | 5/2007 | Bornstein | G06Q 10/107 709/206 |
| 2009/0006285 A1* | 1/2009 | Meek | G06Q 10/10 707/999.1 |
| 2013/0051544 A1* | 2/2013 | Ross | G06Q 30/016 379/265.02 |
| 2015/0250436 A1* | 9/2015 | Hyde | G03B 42/047 378/62 |
| 2021/0127007 A1* | 4/2021 | Krucek | G06Q 10/1097 |

OTHER PUBLICATIONS

"Aspect® Unified IP® Multi-choice Engagement," Aspect Software, Inc. 2013, 3 pages [retrieved online from: www.aspect.com/globalassets/files/assets-old-branding/aspect-unified-ip-multichoice-engagement-ds.pdf].
"Avaya Aura Contact Center Server Administration," Avaya Inc., Jul. 2018, 605 pages, [retrieved online from: downloads.avaya.com/css/P8/documents/101017434].
"Big Data in the Contact Center," Avaya Trend Advisor, 2013, Issue 2, 3 pages.
"CachéTechnology Guide," InterSystems Corporation, Aug. 2013, 56 pages [retrieved online from: https://www.intersystems.com/wp-content/uploads/sites/8/CacheTechnologyGuide.pdf].
"Cisco Unified E-Mail Interaction Manager 9.0 for Cisco Unified Contact Center Enterprise and Hosted and Cisco Unified Intelligent Contact Management," Cisco, updated Jan. 14, 2016, 4 pages [retrieved online from: https://www.cisco.com/c/en/us/products/collateral/customer-collaboration/unified-email-interaction-manager/data_sheet_c78-451504.pdf].
"Contact Center Performance Management Data Dictionary," Avaya Inc., Jul. 2018, 908 pages [retrieved online from: https://downloads.avaya.com/css/P8/documents/101020527].
"The Definition of Span," The Spamhaus Project, accessed Aug. 2018, 2 pages [retrieved online from: www.spamhaus.org/consumer/definition/].
"Genesys Knowledge Management User Guide," Genesys, 2017, 2 pages [retrieved online from: docs.genesys.com/Documentation/ES/8.5.1/KMUser/FAQ?action=pdfbook&title=Documentation:ES:KMUser:FAQ:8.5.1.].
"The UK Contact Centre Decision-Maker's Guide 2017-18," ContactBabel, 2017, 374 pages [retrieved online from: www.cirrusresponse.com/wp-content/uploads/2017/11/UK-CC-DMG-2017-Cirrus-Platinum.pdf].
Aggarwal et al. "A Survey of Text Classification Algorithms," Mining Text Data, 2012, Chapter 6, Springer, Boston, MA, pp. 163-222.
Ayodele et al. "Email Reply Prediction: A Machine Learning Approach," Human Interface and the Management of Information, Information and Interaction: Symposium on Human Interface 2009, Held as part of HCI International 2009, San Diego, CA, Jul. 19-24, 2009, Proceedings Part II, pp. 114-123.
Dietterich "Ensemble Methods in Machine Learning," Proceedings of the First International Workshop on Multiple Classifier Systems, Jun. 21-23, 2000, Cagliari, Italy, 15 pages.
Donges "Evaluation Metrics for Classification," machinelearningblog.com, Apr. 3, 2018, 9 pages [retrieved online from: machinelearningblog.com/2018/04/03/evaluation-metrics-for-classification/].
Frenay et al. "A comprehensive introduction to label noise," Proceedings of the 2014 European Symposium on Artificial Neural Networks, Computational Intelligence and Machine Learning (ESANN 2014), Apr. 23-25, 2014, Bruges, Belgium, pp. 667-676.
Ikonomakis et al. "Text Classification Using Machine Learning Techniques," WSEAS Transactions on Computers, Aug. 2005, vol. 4, No. 8, pp. 966-974.
Joachims "Text Categorization with Support Vector Machines: Learning with Many Relevant Features," ECML'98: Proceedings of the 10th European Conference on Machine Learning, Apr. 1998, pp. 137-142.
Kataria et al. "A Review of Data Classification Using K-Nearest Neighbour," International Journal of Emerging Technology and Advanced Engineering, Jun. 2013, vol. 3, No. 6, pp. 354-360.
Kirkpatrick "AI in contact centers," Communications of the ACM, Aug. 2017, vol. 60, No. 8, pp. 18-19.
Liu et al. "Content Based Spam E-mail Filtering," IEEE, 2016 International Conference on Collaboration Technologies and Systems (CTS), 2016, pp. 218-224 (Abstract Only).
Manning et al. An Introduction to Information Retrieval, 2009, Cambridge University Press, New York, NY, 569 pages.
Murphy "Email Open Interfaces—Developing Compliant Web Services," Avaya, 2014, 11 pages [retrieved online from: https://www.devconnectprogram.com/fileMedia/download/62af286e-3588-484e-94a1-635f6a0cfd3c?accessTime=1595889909023&landing=true].
Nicholson et al. "Label noise correction methods," 2015 IEEE International Conference on Data Science and Advanced Analytics (DSAA), Oct. 19-21, 2015, Paris, France (Abstract Only).
Rowan "Analytics in the Contact Center; The Road to a Better and More Profitable Customer Experience," Avaya Inc., 2011, 10 pages [retrieved online from: www.avaya.com/en/documents/analytics-in-the-cc-gcc4844-%284%29.pdf].
Shung "Accuracy, Precision, Recall or F1?" Towards Data Science, Mar. 15, 2018, 6 pages [retrieved online from: https://towardsdatascience.com/accuracy-precision-recall-or-f1-331fb37c5cb9].
Tang et al. "Email Data Cleaning," Proceedings of the Eleventh ACM SIGKDD International Conference on Knowledge Discovery in Data Mining, Aug. 2005, New York, NY pp. 489-498 (Abstract Only).
Witten et al. "Data Mining: Practical Machine Learning Tools and Techniques," Elsevier, 2011, 3rd edition, 665 pages.
Xu "Bayesian Naïve Bayes classifiers to text classification," Journal of Information Science, Nov. 2016, vol. 44, No. 1, pp. 48-59 (Abstract Only).
Yang et al. "Characterizing and Predicting Enterprise Email Reply Behavior," Proceedings of the 40th Annual International ACM SIGIR Conference on Research and Development in Information Retrieval (SIGIR 2017) , Dec. 2017, 10 pages.
Zhang et al. "Text classification based on multi-word with support vector machine," Knowledge-Based Systems, 2008, vol. 21, pp. 879-886.
Notice of Allowance for U.S. Appl. No. 16/853,108, dated Feb. 25, 2021, 10 pages.

\* cited by examiner

MESSAGE ROUTING IN A CONTACT CENTER

CROSS REFERENCE TO RELATED APPLICATION

This application is a continuation of, and claims priority to U.S. patent application Ser. No. 16/853,108, filed Apr. 20, 2020, the entire disclosure of which is hereby incorporated by reference.

FIELD

Embodiments of the present disclosure relate generally to communication methods and specifically to routing messages in a contact center.

BACKGROUND

The modern contact center is a hub of communications between business and customers, connecting over multiple channels to facilitate sales and support to deliver the best possible customer service. An efficient contact center will maximize the performance of the agents to deliver a prompt and informed service and that depends on intelligent processing to connect the customer to the best available agent in a timely manner.

BRIEF SUMMARY

There is a lot of data collected in the contact center; call recordings, transcripts, customer histories and agent reports, and that constitutes a valuable resource that can enable the next generation of features and improvements in the software. These features will help to better the customer experience and improve contact center processing and routing efficiency. Research and development is being undertaken in areas of service automation, sentiment analysis, speech analytics, customer journey developments and more.

Embodiments of the present disclosure aim to improve contact center performance against key performance metrics by changing how incoming emails are routed. Some emails may be automatically closed with no agent interaction, whereas others may be routed to a person (e.g., a contact center agent, supervisor, etc.) in the organization best equipped to handle it. Data mining and machine learning tools and techniques will discover properties in the data history that can inform a better initial routing for new contacts arriving into the contact center.

An aspect of the present disclosure is, therefore, to use the contact history from a call center to train a series of ensemble classifiers and to categorize incoming emails in two ways: (1) identify contacts that should not enter the contact center and (2) identify valid contacts that do not need agent intervention or interaction. With respect to (1), when emails become contacts, they consume server resources throughout the lifecycle of queuing, assignment, and storage. Because the emails may correspond to SPAM that has avoided or otherwise escaped external filters, these messages represent a drain on physical hardware resources of the contact center that should otherwise be deployed for routing legitimate messages.

With respect to (2), a customer will often reply in an email conversation with an acknowledgment or follow up that should go on the conversation record but does not need any interaction with an agent. These contacts should be queued with a lower priority so that agents can attend to the more important, service level impacting work items in a timely fashion.

Improved processing with respect to either (1) or (2) discussed above will contribute to an improvement in the contact center processing efficiency and will minimize unnecessary utilization of contact center hardware. Furthermore, improvements in handling incoming messages will make an improvement in staff and resource utilization from the better initial assignment.

In the modern contact center, the process to route contacts to agents is based on matching the contents of the incoming email with the skills of the agent. Agents that have been trained and have expertise in certain areas are assigned to groups, called skillsets, that align with their expertise. When an email arrives into the contact center it is analyzed for words or phrases and assigned to a skillset and routed onward to an agent. In a specific, but non-limiting example, the "MailTo" address of the incoming email might represent a mailbox or an alias for a mailbox. The mailboxes are polled regularly to retrieve the messages and then a set of system and custom routing rules are applied to the incoming email. First, a system level rule to detect if the mail is a delivery failure message related to previously sent outgoing mail, then a system level rule to detect for prohibited words or phrases, and finally customized rules based on the address the mail was sent to.

The custom rules can be actioned on the sender address or on keyword and partial keyword matching. The custom group of rules can be applied on a best match or first match basis to prioritize based on the score or the rule. When the routing rule has been determined then the skillset and priority is known, and the email is progressed through the contact center to be delivered to an agent with the appropriate skills.

When an agent is dealing with a contact they have the option to resolve it with a templated or freeform text reply to the customer. When complete, they must wrap up the contact and set a closed reason. If they are not able to complete the task, then they can transfer to another skillset where an agent with the correct skills can pick up and complete the task. Analysis of these transfer patterns could form the basis of improved message routing.

The closed reason is an indicator of the resolution status; for example, Sale or No Sale to capture useful information to report on later. It is often used to capture if the email contact was SPAM that escaped an external spam filter or custom spam rule in the system. In some embodiments, analysis of messages having a closed reason as an indicator of the resolution status provides a supervised sample of data identified as SPAM within a contact center domain.

Contact centers deal with multi-channel contacts (e.g., SMS text messages, web chats, email, etc.). Multiple agents service incoming contacts and many agents often service multiple contacts simultaneously. The routing within a contact center can be improved in accordance with embodiments of the present disclosure in how it services text-based messages by: (1) enhanced spam filtering—provides spam filters on new items (such as a LinkedIn invitation) and (2) prioritizing messages for service that need an agent reply over messages that do not need an agent reply.

When an email comes into the agent that is not relevant to the contact center, it is tagged as irrelevant. From the body of all messages that had been seen and tagged or not tagged, a learning engine is proposed herein that is capable of learning what has been done on a message by agents and does the same thing (e.g., tag or not tag) or move a message up or down in priority. Multiple models are used in sequential stages to filter and prioritize messages for service. Stages are based on observed contact center behavior.

According to one aspect of the present disclosure a method of managing contacts in a contact center, the method including: receiving a text-based communication from a customer of the contact center; analyzing the text-based communication to determine a relevancy associated with the text-based communication; based on the analysis, determining a relevancy level to assign to the text-based communication; tagging the text-based communication with a relevancy tag that identifies the determined relevancy level; updating a priority associated with assigning the text-based communication to an agent of the contact center based on the relevancy tag; assigning the text-based communication to the agent of the contact center; storing the text-based communication with the relevancy tag in a database of text-based communications, where the text-based communication is also stored with at least one agent note associated therewith; enabling a machine learning process to analyze the database of text-based communications; and updating a data model used to automatically tag text-based communications with relevancy tags based on the analysis performed by the machine learning process.

In some embodiments, the text-based communication includes an email from the customer to the contact center.

In some embodiments, at least one agent note includes an affirmation that the relevancy level identified by the relevancy tag is appropriate.

In some embodiments, at least one agent note includes a change to the relevancy level identified by the relevancy tag.

In some embodiments, the machine learning process performs a semantic and/or syntactic analysis of text contained in the text-based communication. The machine learning process may utilize data models such as Decision Trees, Support Vector Machines (SVMs), Nearest Neighbor, and/or Bayesian classifiers.

Another aspect of the present disclosure is that the method further includes: updating a second data model used to automatically tag communications other than text-based communications based on the analysis performed by the machine learning process.

Another aspect of the present disclosure is that the method further includes: receiving a second text-based communication from another customer of the contact center; and automatically tagging the second text-based communication with a second relevancy tag that identifies a relevancy level determined by the data model.

As used herein, a message may include one or multiple electronic records, text, rich media, or data structures that are transmitted from one communication device to another communication device via a communication network. A message may be transmitted via one or more data packets and the formatting of such data packets may depend upon the messaging protocol used for transmitting the electronic records over the communication network.

As used herein, an agent state or state of an agent may include one or more of an AVAILABLE state, an OCCUPIED state, a BUSY state, an AFTER-CALL WORK (ACW) state, an UNAVAILABLE state, or any other agent state known or yet to be developed for use in a contact center.

As used herein, a data model may correspond to a data set that is useable in an artificial neural network and that has been trained by one or more data sets that describe conversations or message exchanges between two or more entities. The data model may be stored as a model data file or any other data structure that is useable within a neural network or an Artificial Intelligence (AI) system.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for machine learning tools to support message routing functions within a contact center. Embodiments of the present disclosure are also contemplated to automatically filter and tag messages, as appropriate, based on an analysis of previously tagged and processed messages.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
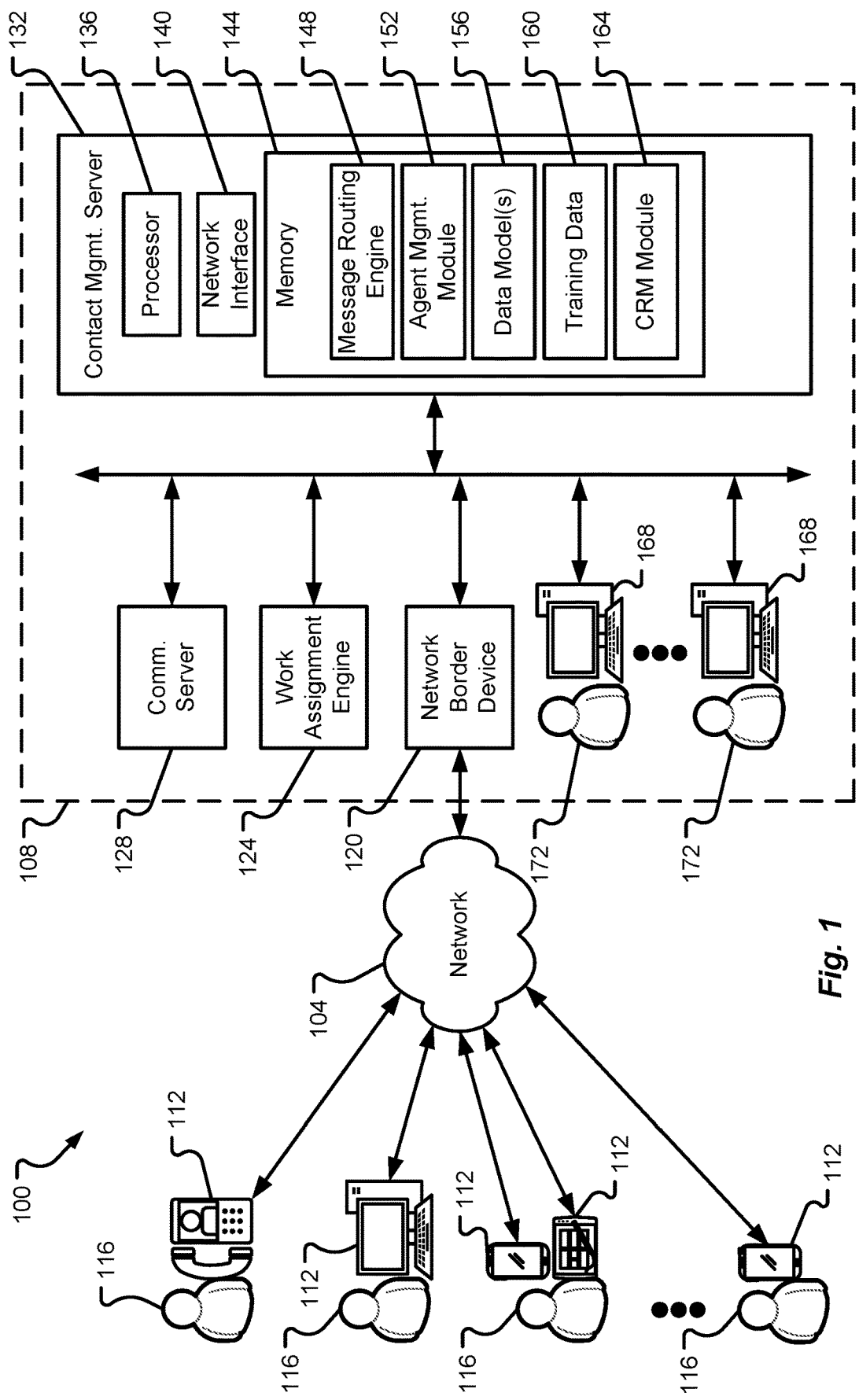
FIG. 1 is a block diagram illustrating a communication system in accordance with at least some embodiments of the present disclosure.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. The customer 116 may correspond to a user or person that interacts with their customer communication device 112 to communicate with a resource of the contact center 108. Specifically, the contact center 108 may include a number of resources that facilitate customer 116 interactions via one or multiple communication channels that are presented to and maintained for use by the customer 116 and one or more of their customer communication devices 112. As shown in FIG. 1, a customer 116 may utilize one or multiple customer communication devices 112 to interact with the contact center. Moreover, embodiments of the present disclosure contemplate that the customer 116 may use multiple different customer communication devices 112 to communicate via a single asynchronous communication channel. As a non-limiting example, a customer 116 may login to a web-based portal or authenticate themselves with a particular chat channel and then utilize the web-based portal or chat channel to communicate with any one of their customer communication devices 112. Alternatively or additionally, a customer 116 may use one of their customer communication devices 112 to send email messages to the contact center 108 whereas another customer communication device 112 is used to send messages of another type (e.g., chat messages or SMS messages) and/or to communicate with the contact center 108 via a voice channel.

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These customer communication devices 112 may also have any of a variety of applications, including for example, a database client and/or server applications, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 172 to interact with a customer 116 via a communication channel established between the customer communication device 112 and the contact center 108. In particular, the contact center 108 is shown to include a network border device 120 and a number of servers 124, 128, 132 that enable functionality of the contact center 108. The network border device 120 may correspond to one or a number of devices that establish and maintain information security for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that pass through the network border device 120 may be transferred to the communication server 128 or work assignment engine 124 for further analysis and processing (e.g., for inclusion with a particular conversation, for assigning/forwarding to a particular contact center agent 172, etc.).

In some embodiments, each server of the contact center 108 may be configured to perform a particular task or a set of tasks specific to supporting functions of the contact center 108. For instance, the work assignment engine 124 may correspond to a server or set of servers that are configured to receive messages from the network border device 120 and make routing decisions for the message(s) within the contact center 108. The communication server 128 may correspond to a single server or a set of servers that are configured to establish and maintain a communication channel between customers 116 and the contact center 108. In some embodiments, the work assignment engine 124 and communication server 128 may work in cooperation to ensure that an appropriate agent 172 or set of agents 172 are assigned to a particular communication channel (e.g., a text-based communication channel) for purposes of servicing/addressing contacts initiated by customers 116 of the contact center 108. In some embodiments, the work assignment engine 124 and communication server 128 may operate in cooperation with the contact management server 132 to intelligently route messages to particular agents 172 (or particular inboxes assigned to an agent or pool of agents) as will be discussed in further detail herein. Specifically, but without limitation, the work assignment engine 124 may be configured to determine which agent 172 should be assigned to a particular communication channel (e.g., assigned to a particular message inbox, assigned to a particular chat channel, and/or designated to receive a particular email message) for purposes of answering a customer's 116 question and/or for purposes of providing a service to the customer 116. The work assignment engine 124 may provide appropriate signaling to an agent's communication device 168 that enables the agent's communication device 168 to connect with the communication channel over which the customer 116 is communicating and/or to enable the agent 172 to view messages sent by the customer's communication device 112, which are eventually assigned to and posted on the appropriate communication channel.

In some embodiments, the communication server 128 may be responsible for establishing and maintaining a digital text-based communication channel that is presented to the customer's communication device 112 and which enables the customer 116 to send messages to the contact center 108 when desired. As a non-limiting example, the communication server 128 may correspond to an email server or the like that is configured to process messages received from the work assignment engine 124 and/or network border device 120 and utilize an email messaging protocol (e.g., to inform an agent 172 of a received message, to enable an agent 172 to respond to received messages, etc.). Non-limiting examples of protocols that may be supported by the communication server 128 include Internet Message Access Protocol (IMAP), Post Office Protocol (POP), Simple Mail Transfer Protocol (SMTP), and Exchange. The communication server 128 may alternatively or additionally be configured to support real-time or near-real-time text-based communication protocols, video-based communication protocols, and/or voice-based communication protocols.

When messages are received from a customer communication device 112 and assigned to a particular communication channel, the work assignment engine 124 may initially assign the message to a particular communication channel that is hosted by the communication server 128. In some embodiments, as will be described in further detail herein, the decision of message routing may be made with assistance from the contact management server 132. Alternatively, an initial routing decision may be made by the work assignment engine 124, but then the contact management server 132 may re-route or forward a message to a different entity based on intelligent operations of its message routing engine 148. In either event, the routine engine 124 alone or with support of the contact management server 132 may determine which agent 172 will service the customer's 116 needs (e.g., answer a question, provide a service, etc.) and then route the message received from the customer communication device 112 to the selected agent's communication device 168 and/or to an appropriate location in the communication server 128 where it can be viewed by the selected agent 172.

As mentioned above, although described as an email server, it should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. Again, in addition to supporting text-based communications, the communication server 128 may also be configured to support non-text-based communications such as voice communications, video communications, and the like.

Another server or set of servers that may be provided in the contact center 108 is a contact management server 132. The contact management server 132 may be configured to manage the contacts or work items that exist within the contact center 108 and that represent tasks to be performed by a human agent 172 and/or automated agent (e.g., a chatbot) in connection with providing a service to a customer 116. The contact management server 132 may be configured to maintain state information for some or all of the contacts in the contact center 108 at any given point in time. The contact management server 132 may also be configured to manage and analyze historical contacts as part of training and updating automated routing engines (e.g., a message routing engine 148). In some embodiments, the contact management server 132 may maintain state information for human agents 172 in the contact center 108 and may further interact with the work assignment engine 124 to determine which agents 172 are currently available for servicing a contact and have the appropriate skills for servicing a contact. These capabilities of the contact management server 132 may be provided by an agent management module 152 stored in memory 144 and executed by a processor 136 of the contact management server 132.

Additional capabilities of the contact management server 132 will be described in further detail with respect to operation of a message routing engine 148 and the agent management module 152, which are both shown to be provided by the contact management server 132. While certain components are depicted as being included in the contact management server 132, it should be appreciated that such components may be provided in any other server or set of servers in the contact center 108. For instance, components of the contact management server 132 may be provided in a work assignment engine 124 and/or communication server 128, or vice versa. Further still, embodiments of the present disclosure contemplate a single server that is provided with all capabilities of the work assignment engine 124, the communication server 128, and the contact management server 132.

The contact management server 132 is shown to include a processor 136, a network interface 140, and memory 144. The processor 136 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

The network interface 140 may be configured to enable the contact management server 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions that are executable by the processor 136 and that ultimately provide functionality of the communication management server 132 described herein. The memory 144 may also be configured to store data or information that is useable or capable of being called by the instructions stored in memory 144. One example of data that may be stored in memory 144 for use by components thereof is a data model 156 and/or training data 160. The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the contact management server 132, it should be appreciated that the memory 144 may correspond to a memory device, database, or appliance that is external to the contact management server 132.

Illustratively, the memory 144 is shown to store a message routing engine 148 for execution by the processor 136. In some embodiments, the message routing engine 148 may correspond to a set of processor-executable instructions (e.g., a finite instruction set with defined inputs, variables, and outputs). In some embodiments, the message routing engine 148 may correspond to an AI component of the contact management server 132 that is executed by the processor 136. The message routing engine 148, in some embodiments, may utilize one or more data models 156, which may be in the form of an artificial neural network, for recognizing and processing messages transmitted by a customer 116 over a communication channel supported by the communication server 128. In some embodiments, the message routing engine 148 may be trained with training data 160 and may be programmed to learn from additional message exchanges, conversations as such conversations occur, or after conversations occur. In some embodiments, the message routing engine 148 may update one or more of the data models 156 as it learns from ongoing message exchanges and dispositions by an agent 172.

The memory 144 is also shown to include a Customer Relationship Management (CRM) module 164, which may be responsible for obtaining customer 116 information from a message, storing customer 116 information during and after an interaction with the contact center 108, and/or obtaining customer 116 information to support servicing a contact initiated by the customer 116. In some embodiments, the CRM module 164 may be configured to maintain a CRM database within the contact management server 132 or external from the contact management server 132. The CRM database may be used to store customer 116 data in any number of data formats (e.g., as sales history, as contact history, as subscription levels, etc.). The CRM module 164 may be configured to obtain and provide relevant customer 116 data to an agent 172 when an agent 172 is viewing a contact or message transmitted by the customer 116, thereby facilitating the agent's 172 ability to service the contact or respond to the message.

As mentioned above, the message routing engine 148 may be configured to operate using a set of guidelines (e.g., as a set of static instructions) or by using machine learning. Further details of a message routing engine 148 utilizing machine learning will now be described with reference to FIG. 2. Again, the message routing engine 148 utilizing machine learning may have access to training data 160 to initially train behaviors of the message routing engine 148. The message routing engine 148 may also be configured to learn from further conversations or message exchanges based on feedback, which may be provided in an automated fashion (e.g., via a recursive learning neural network) and/or a human-provided fashion (e.g., by a human agent 172).

A learning/training module 204 of the message routing engine 148 may have access to and use one or more data models 156. The data models 156 may be built and updated by the training/learning module 204 based on the training data 160 and feedback. The data models 156 may be provided in any number of formats or forms. Non-limiting examples of data models 156 include Decision Trees, SVMs, Nearest Neighbor, and/or Bayesian classifiers.

The learning/training module 204 may also be configured to access information from an assignment/filter/tag decision database 212 for purposes of building a historical message database 216, which effectively stores message responses, message processing history, message tags, message notes, agent 172 notes associated with a message, message assignment decisions, etc. Messages within the historical message database 216 may constantly be updated, revised, edited, or deleted by the learning/training module 204 as the message routing engine 148 processes more messages received from customers 116 and message dispositions received from agents 172.

Figure 2:
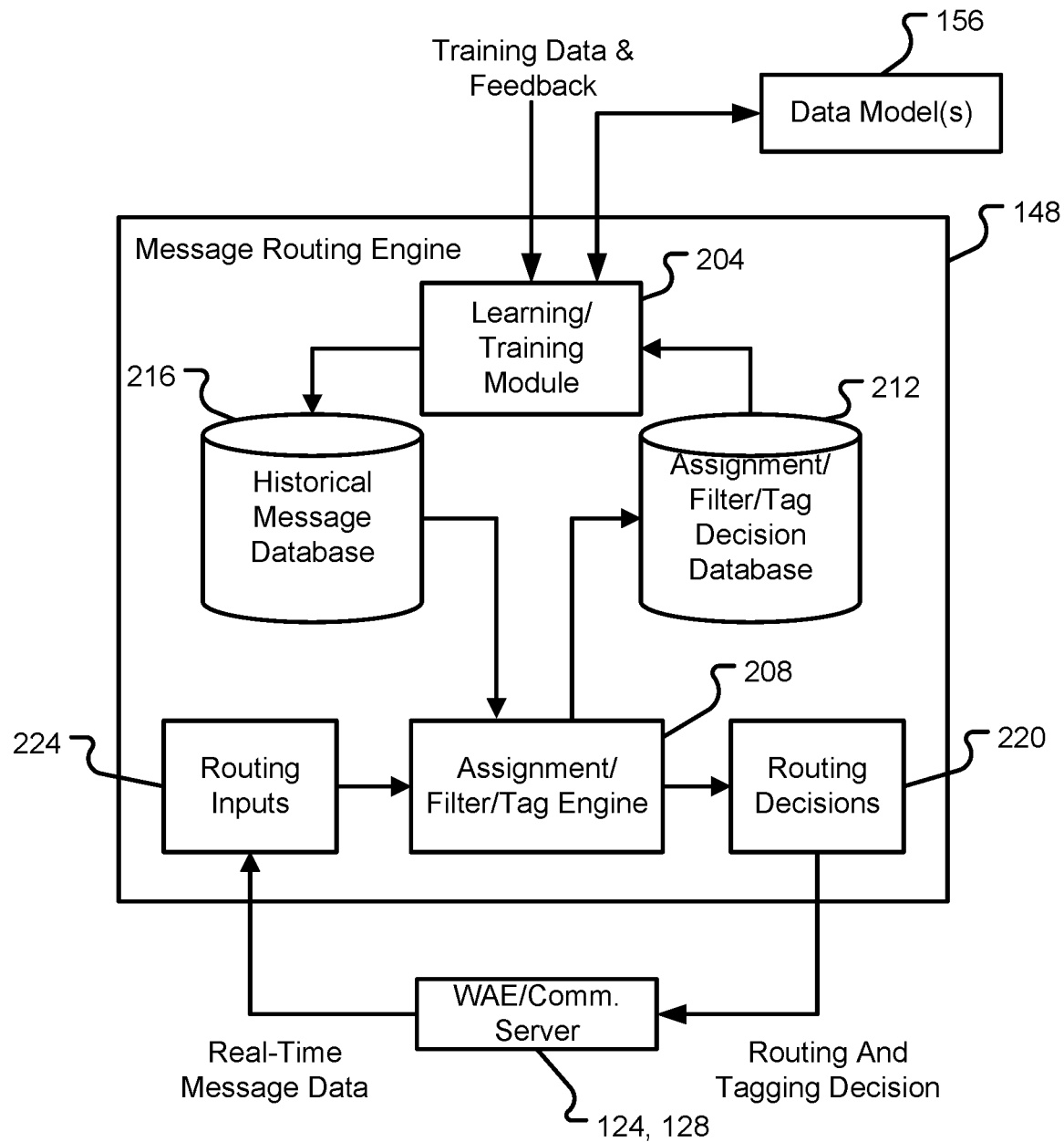
FIG. 2 is a block diagram depicting additional details of a message routing engine in accordance with at least some embodiments of the present disclosure.

In some embodiments, the message routing engine 148 may include an assignment/filter/tag engine 208 that has access to the historical message database 216 and selects appropriate message processing decisions (e.g., routing decisions 220) based on input from the historical message database 216 and based on routing inputs 224 received from the work assignment engine 124 and/or communication server 128. As shown in FIG. 2, the message routing engine 148 may receive routing inputs 224 in the form of real-time message data from the work assignment engine 124 and/or communication server 128. The routing inputs 224 may include information about a message recently received from a customer and the work assignment engine's 124 proposed routing decision for the message. Alternatively or additionally, the routing input 224 may include information from the communication server 128 indicating that a message has been received with a particular address (e.g., email address, chat address, IP address) managed by the communication server 128. The real-time message data may also include the content of a message received on a communication channel from a customer's communication device 112.

Using the dialog inputs and the historical message database 216, the assignment/filter/tag engine 208 may be configured to recommend one or multiple actions as a routing decision 220. The routing decision 220 may be provided as an output of the message routing engine 148 back to the work assignment engine 124 and/or communication server 128. In some embodiments, the routing decision 220 may include instructions for assigning a message to a particular agent 172, assigning a message to a different agent 172 than was initially selected by the work assignment engine 124, filtering the message such that the message is not transmitted to the communication server 128, deleting the message, tagging the message with a particular data tag or indicator, changing a priority of the message, etc.

To enhance capabilities of the message routing engine 148, the message routing engine 148 may constantly be provided with training data 160 from conversations between human agents 172 and customers 116 that have occurred over a particular communication channel. It may be possible to train a message routing engine 148 to have a particular output or multiple outputs.

Figure 3:
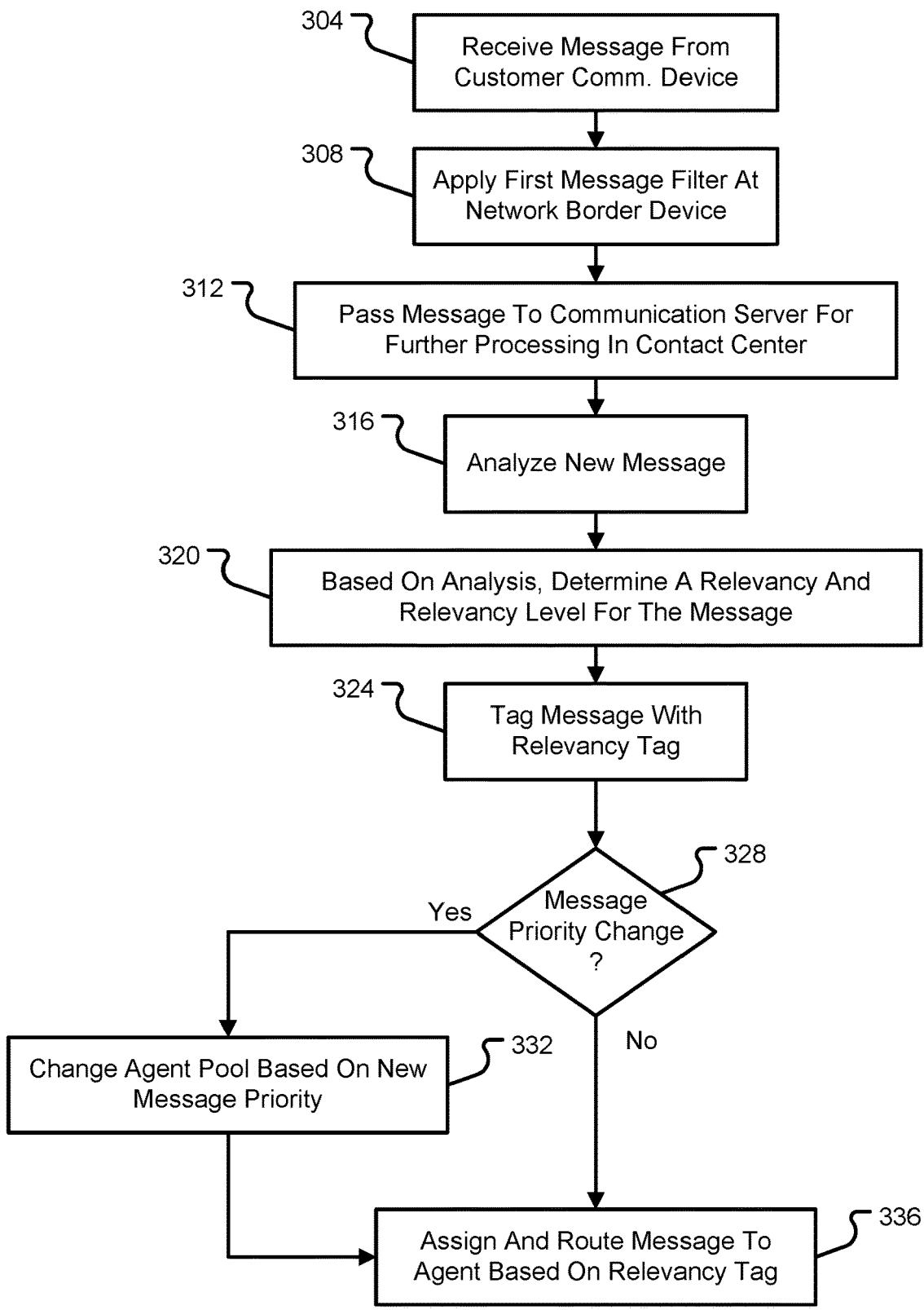
FIG. 3 is a flow diagram depicting a first communication method in accordance with at least some embodiments of the present disclosure.

Referring now to FIG. 3, a first communication method will be described in accordance with at least some embodiments of the present disclosure. The method begins when a message is received from a customer communication device 112 in a contact center 108 (step 304). The message may be referred to as a customer message and may correspond to any type of message described herein (e.g., text-based message, chat message, SMS message, email message, voice message, video message, etc.).

The method continues with a network border device 120 filtering the message with a first set of filter criteria and/or rules (step 308). The initial filtering may be applied by a firewall contained within the network border device 120 and the initial filtering may be rules-based.

The method then continues by passing the message along to a work assignment engine 124 and/or a communication server 128 within the contact center 108 (step 312). The method may then proceed with an analysis of the message (step 316). The analysis may be performed by the work assignment engine 124 alone or with assistance from the message routing engine 148. In some embodiments, the work assignment engine 124 and/or message routing engine 148 may determine a relevancy and/or relevancy level for the message (step 320). In some embodiments, the message routing engine 148 may be configured to analyze the message (metadata and/or content thereof) to determine an assignment decision for the message, determine a filter decision for the message, and/or determine a tag decision for the message. The analysis may include the message routing engine 148 processing the message with one or more data models 156 to determine whether the message should be routed differently from what was decided by the work assignment engine 124, whether the message should be filtered and/or automatically deleted, and/or whether the message should be tagged and assigned a different processing priority than was initially assigned to the message.

The method may then continue by tagging the message with a relevancy tag (step 324) and determining if the priority of the message has changed based on the relevancy tag and any other routing decisions 220 made by the message routing engine 148 (step 328). If the message priority was changed as a result of processing by the message routing engine 148, then the method may include changing the priority assigned to the message, appropriately tagging the message, and optionally changing an agent 172 or agent pool to which the message is assigned based on the new priority of the message (step 332). In other words, if the message priority changes such that the message should be assigned to a different set of agents 172 (e.g., agents having a different skill set, agents assigned to handle different priority messages, etc.). As a non-limiting example, if the message priority is decreased (e.g., becomes less important and, therefore, a lesser priority), then the message may be assigned to a pool of agents that are multi-tasking on many other interactions/contacts. Alternatively, if the message priority is increased (e.g., becomes more important and, therefore, a higher priority), then the message may be assigned to a particular agent or a pool of agents that are not multi-tasking or that have a skill to handle higher priority messages.

Thereafter, the message may be assigned based on the new priority assigned thereto and based on the relevancy tag assigned thereto (step 336). Alternatively, if the query of step 328 returned a negative result, then the message may be assigned and routed based on the original relevancy tag and based on the original message priority (step 336).

It should be noted that the analysis of step 316 may result in a decision to lower a priority of a message so low that the message is automatically filtered or deleted by the message routing engine 148 rather than being assigned and routed to an agent 172. In particular, if the message routing engine 148 determines that the message corresponds to SPAM even though the message passed through the network border device 120, then the message routing engine 148 may automatically delete or sandbox the message. In this situation, the message may not be assigned or routed to any agent 172 or agent inbox.

Figure 4:
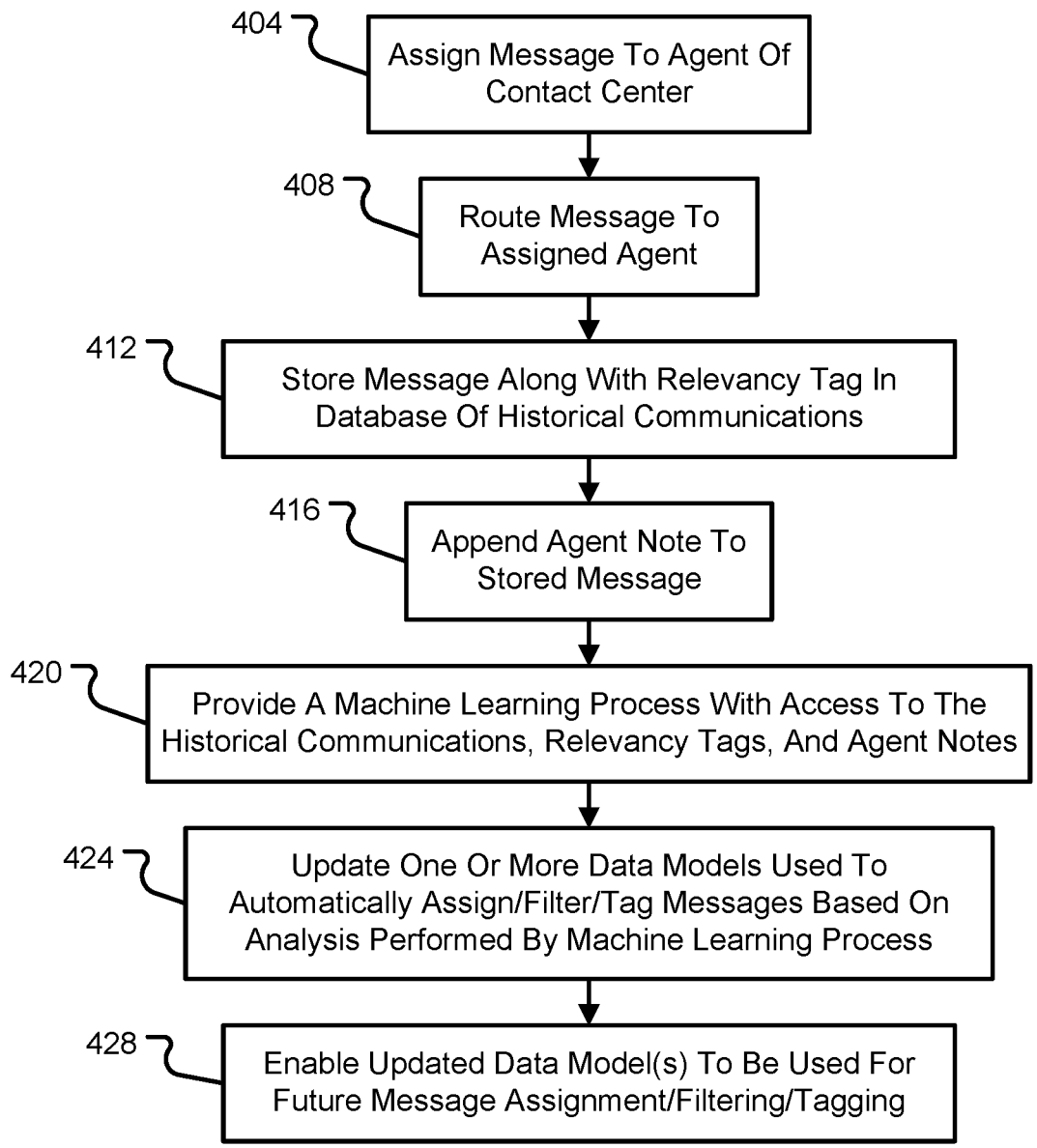
FIG. 4 is a flow diagram depicting a second communication method in accordance with at least some embodiments of the present disclosure.

Referring now to FIG. 4, a second communication method will be described in accordance with at least some embodiments of the present disclosure. The method begins when a message is assigned to an agent 172 of a contact center 108 (step 404). The decision to assign the message to the agent 172 may be made by the work assignment engine 124, the message routing engine 148, or a combination thereof.

The method may continue by routing the message to the assigned agent (step 408). Before, after, or in parallel with routing the message to the agent, the method may also include storing the message along with any relevancy tag associated therewith in a database of historical communications 216 (step 412). This may occur immediately or after processing by the learning/training module 204 of the message routing engine 148.

The method may also include a step of appending an agent note to the stored message (step 416). This step may be performed concurrently with step 412 and may be performed with training data and/or agent feedback received from an agent 172 that handled the message. The feedback provided by the agent 172 to the learning/training module 204 may allow the learning/training module 204 to learn and possibly update a data model 156 based on the agent feedback.

The method may, therefore, continue by enabling a machine learning process (e.g., the message routing engine 148) to access the historical message database 216 and/or the assignment/filter/tag decision database 212 (step 420). Based on its access of the database(s), the message routing engine 148 may update one or more data models 156 (step 424). The updated data models 156 may then be used by the message routing engine 148 to process messages received in the future (step 428). Specifically, the updated data models 156 may be used to make future decisions on message assignment/filtering/tagging.

Figure 5:
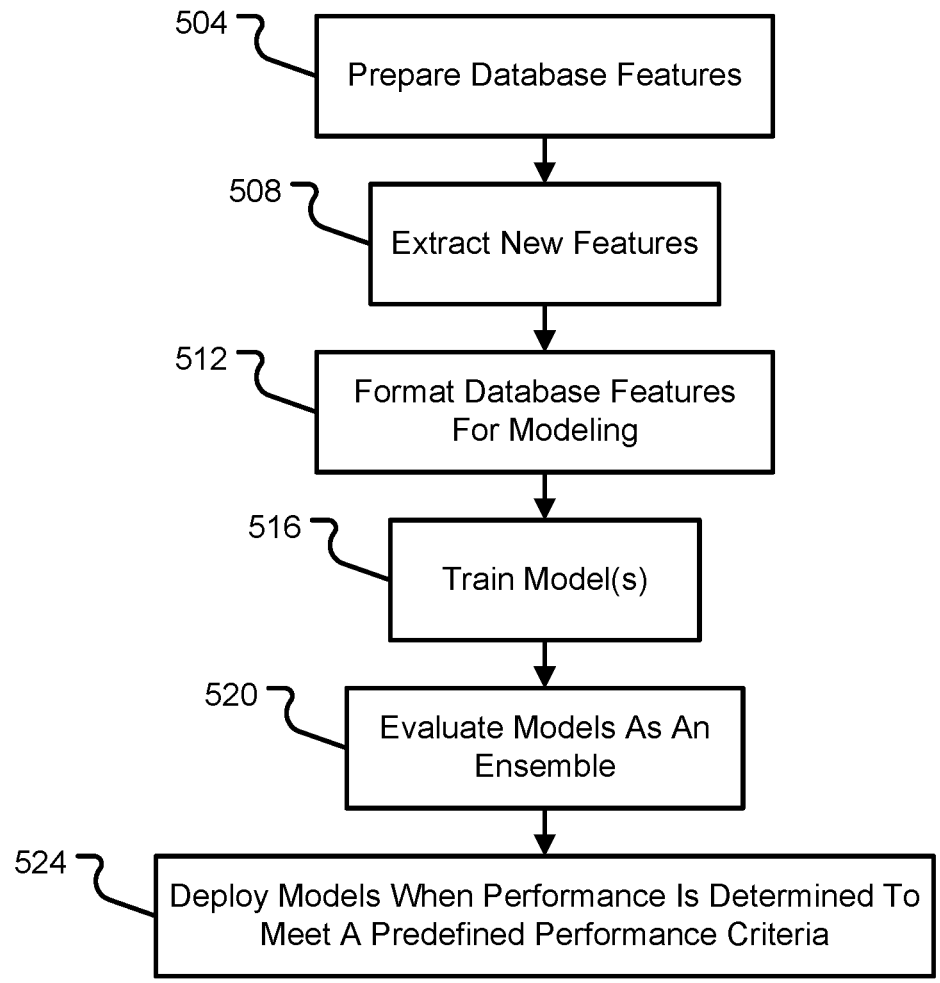
FIG. 5 is a flow diagram depicting the creation and updating of data models in accordance with at least some embodiments of the present disclosure.

Referring now to FIG. 5, another method will be described in accordance with at least some embodiments of the present disclosure. The following method will relate to the creation and updating of data models 156. When analyzing text-based messages, a text classification process may be followed. The training data 160 corpus used may correspond to a collection of documents and the words in the corpus form the vocabulary. Each document is read and prepared by tokenizing the document into an array of words. The words can be stemmed to common roots and stopwords can be removed. Stopwords (such as "a", "the", "of") that appear in all the documents do not contribute to learning and are best to be removed to reduce the feature dimensionality and focus on the important topic related words. The remaining text is then represented in a vector space model mapping the normalized word counts to the documents in which they occur. When the documents in the vector space have already been categorized, then the bag-of-words features represented in the vector space can be used in supervised learning.

Naive Bayes is a simple supervised classifier that assigns a classification to a sample based on the occurrences of the sample words in the training data. It is based on Bayes' rule that can predict the probability of a class given an observation based on previous, prior observed probabilities of the features occurring in the data.

A decision tree is a readable, easy to understand hypothesis used to make predictions for unseen samples. It is a supervised learning algorithm that generates a decision tree from a set of categorized examples. The information gain is calculated for each of the features in the training data 160 and the feature that yields the highest information gain, the most informative, is added as a decision node on the tree. A branch is added from the decision node to represent each possible outcome. The information gain calculation is repeated recursively for the subset of data partitioned by the branch to create more decision nodes based on the most informative features. If all the samples in a subset return the same classification, then that is the decision. If all attributes have been tested, then the majority class of the remaining samples is the decision.

K-Nearest Neighbours (kNN) is a simple instance-based learning algorithm that assigns a class to a sample by comparing it to the k most similar training samples and assigning the majority class. It is a lazy algorithm and represents each training sample as a feature vector. The sample case is compared to all the training samples by measuring the Euclidean or other distance and the majority vote from the k closest is assigned to the sample.

The SVM is a classifier that tries to find a decision plane to best separate the training samples into two classes. When the data is not linearly separable, it is transformed to a new feature space using a kernel function where it does become linearly separable. SVM works well with high dimensional data so performs well for text classification tasks.

Each supervised training instance contains the text properties of the email; sender, recipients, subject and email body. The words contained in these fields are added to a vector space model with the associated classification. From this bag-of-words, the term frequency and inverse document frequency, TF-IDF, will be a measure of the importance of the words in the corpus. The data models 156 are not only trained on the bag-of-words, but also using meaningful features extracted from the context of the email.

On the question of identifying spam email, these additional features are properties like the time of day the mail arrives, or the number of recipients, or whether this email a follow-up in a conversation. These properties need to be extracted from the context and added as extra features in the training instances.

On the question of predicting if an email needs a reply, the most recent message is the email chain is important, so the earlier embedded conversation should be removed from the training data 160.

The method described herein may correspond to an iterative process and may begin with the preparation of database features (step 504). This data corpus will be analyzed to identify the features that can contribute to the classification problems of detecting spam and predicting if a reply is needed, for example. The features will be extracted from the core data (e.g., from the database 212, 216) into a sandbox table for further manipulation (step 508). The message routing engine 148 may then format the database features for modeling, consistent with the data model 156 format(s) (step 512). Once formatted, each of the data models 156 may be trained using training data 160 and agent 172 feedback (step 516). The training of the data models 156 may depend upon the type of model being used. In some embodiments, each of the data models 156 may be trained to identify whether (1) a message corresponds to SPAM and (2) the message does or does not require a reply from an agent 172.

The performance of the models 156 may be evaluated as an ensemble (step 520) to determine whether and when the models 156 can be deployed for use by the message routing engine 148 (step 524). This decision may be made if the performance of the models is determined to meet a predefined performance criteria.

Figure 6:
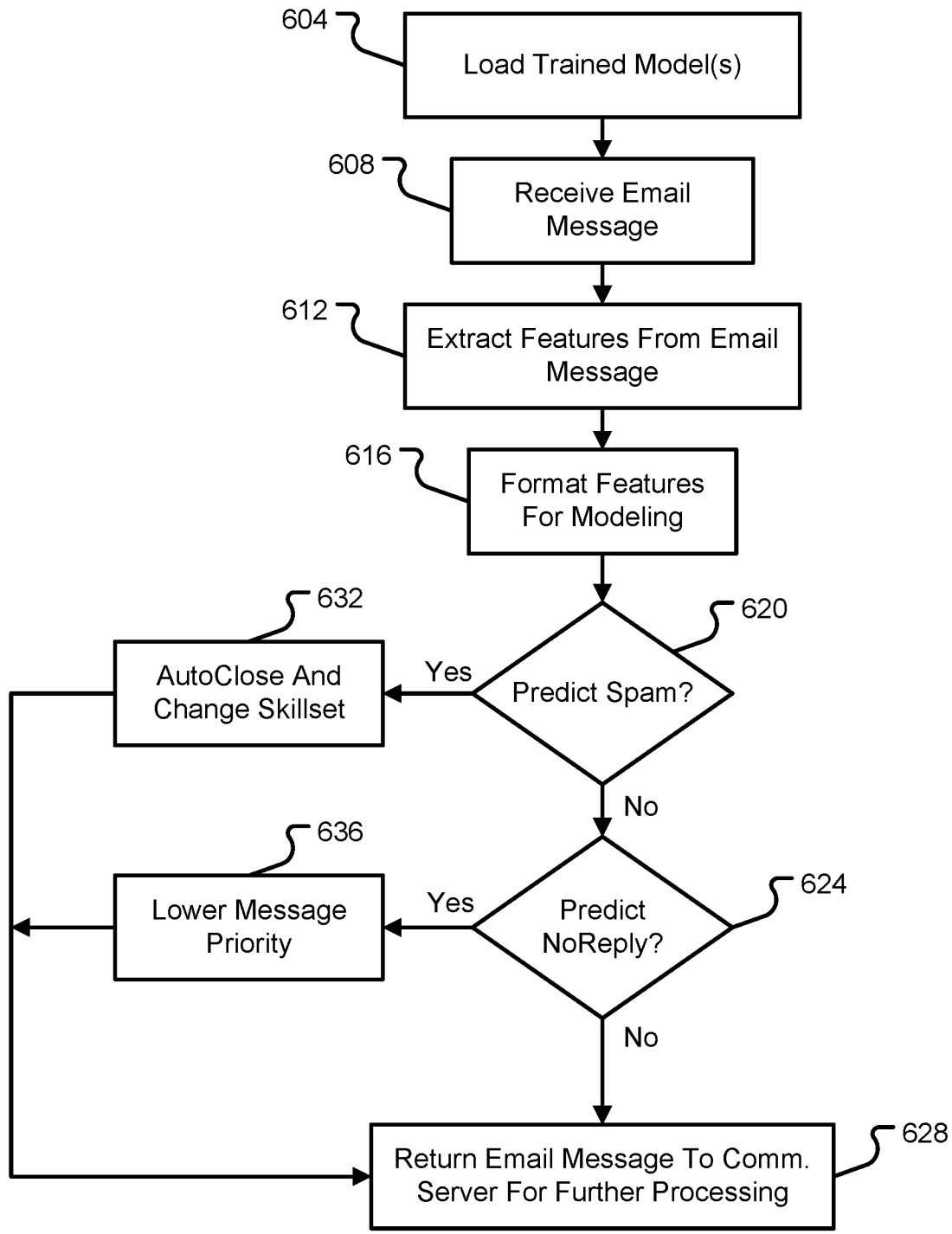
FIG. 6 is a flow diagram depicting how the data models are incorporated into the message routing in accordance with at least some embodiments of the present disclosure.

Referring now to FIG. 6, another method will be described in accordance with at least some embodiments of the present disclosure. The method begins by loading trained models 156 for use by the message routing engine 148 (step 604). The method continues when an email (or other message type) is received from a customer 116 (step 608). The message routing engine 148 may continue by extracting defined features from the email message (step 612) and formatting the features for modeling with each of the data models 156 (step 616).

Outputs of the data models 156 may provide one or two indicators. Specifically, the data models 156 may provide a decision on whether or not a message corresponds to SPAM (step 620) and whether or not a message requires no reply (step 624).

If both queries are answered negatively, then the message may be processed in the normal fashion, forwarded to the communication server 128, which eventually notifies the appropriate agent(s) 172 of the newly-received message (step 628). If one or more of the data models 156 predict the message corresponds to SPAM, then the method may continue with the message routing engine 148 and/or work assignment engine 124 automatically closing the contact associated with the message and possibly automatically deleting the message (step 632). The communication server 128 may also be notified of the action if the message was initially provided to the communication server 128 prior to analysis by the message routing engine 148.

If one or more of the data models 156 predict the message does not require a reply, then the message priority may be lowered (step 636). After the message priority is lowered, the method may then proceed to step 628.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing contacts in a contact center, the method comprising:
   receiving a communication from a customer of the contact center;
   analyzing the communication to determine a relevancy associated with the communication;
   tagging the communication with a relevancy tag that identifies the determined relevancy;
   assigning the communication to an agent of the contact center;
   storing the communication with the relevancy tag in a database of communications, wherein the communication is also stored with at least one agent note associated therewith;
   enabling a machine learning process to analyze the database of communications; and
   updating a data model used to automatically tag communications with relevancy tags based on the analysis performed by the machine learning process.

2. The method of claim 1, wherein the communication comprises a text-based communication from the customer to the contact center.

3. The method of claim 2, wherein the text-based communication from the customer to the contact center comprises an email.

4. The method of claim 1, wherein the at least one agent note comprises an affirmation of the agent that the relevancy tag is accurate.

5. The method of claim 1, wherein the at least one agent note comprises a change of the agent applied to the relevancy tag.

6. The method of claim 1, wherein the machine learning process performs a semantic and/or syntactic analysis of text contained in the communication.

7. The method of claim 1, further comprising:
   updating a second data model used to automatically tag communications other than text-based communications based on the analysis performed by the machine learning process.

8. The method of claim 1, further comprising:
   receiving a second communication from another customer of the contact center; and
   automatically tagging the second communication with a second relevancy tag that identifies a relevancy level determined by the data model.

9. A method, comprising:
   receiving a communication associated with a customer of a contact center;
   analyzing the communication to determine a relevancy associated with the communication;
   tagging the communication with a tag that identifies the determined relevancy;
   updating a priority associated with assigning the communication to an agent of the contact center based at least in part on the relevancy tag;
   storing the communication with the tag in a database of communications;
   enabling a machine learning process to analyze the database of communications; and updating a data model used to automatically tag communications with tags based on the analysis performed by the machine learning process.

10. The method of claim 9, wherein the communication is also stored with at least post-interaction data structure associated therewith.

11. The method of claim 9, wherein the communication comprises a text-based communication.

12. The method of claim 9, further comprising:
routing the communication based on the determined relevancy associated with the communication.

13. The method of claim 9, wherein the communication comprises a voice communication.

14. The method of claim 9, wherein the communication comprises a video communication.

15. A system, comprising:
a processor; and
a memory coupled to the processor and storing data thereon that, when executed by the processor, enable the processor to:
receive a communication associated with a customer of a contact center;
analyze the communication to determine a relevancy associated with the communication;
tag the communication with a tag that identifies the determined relevancy;
update a priority associated with assigning the communication to an agent of the contact center based at least in part on the relevancy tag;
store the communication with the tag in a database of communications;
enable a machine learning process to analyze the database of communications; and
update a data model used to automatically tag communications with tags based on the analysis performed by the machine learning process.

16. The system of claim 15, wherein the communication is also stored with at least post-interaction data structure associated therewith.

17. The system of claim 15, wherein the communication comprises a text-based communication.

18. The system of claim 15, wherein the data, when executed by the processor, further enable the processor to:
route the communication based on the determined relevancy associated with the communication.

19. The system of claim 15, wherein the communication comprises a voice communication.

20. The system of claim 15, wherein the communication comprises a video communication.

21. A system, comprising:
a processor; and
a memory coupled to the processor and storing data thereon, wherein the data, when processed by the processor, enable the processor to:
receive a communication from a customer of a contact center;
analyze the communication to determine a relevancy associated with the communication;
tag the communication with a relevancy tag that identifies the determined relevancy;
assign the communication to an agent of the contact center;
store the communication with the relevancy tag in a database of communications, wherein the communication is also stored with at least one agent note associated therewith; and update a data model used to automatically tag communications with relevancy tags based on an analysis of the database performed by a machine learning process.

22. The system of claim 21, wherein the communication comprises a text-based communication from the customer to the contact center.

23. The system of claim 22, wherein the text-based communication from the customer to the contact center comprises an email.

24. The system of claim 21, wherein the at least one agent note comprises an affirmation of the agent that the relevancy tag is accurate.

25. The system of claim 21, wherein the at least one agent note comprises a change of the agent applied to the relevancy tag.

26. The system of claim 21, wherein the machine learning process performs a semantic and/or syntactic analysis of text contained in the communication.

27. The system of claim 21, wherein the data, when processed by the processor, further enable the processor to:
update a second data model used to automatically tag communications other than text-based communications based on the analysis performed by the machine learning process.

28. The system of claim 21, wherein the data, when processed by the processor, further enable the processor to:
receive a second communication from another customer of the contact center; and
automatically tag the second communication with a second relevancy tag that identifies a relevancy level determined by the data model.

29. A contact center, comprising:
a server including a processor and a message routing engine that is executable by the processor and that enables the processor to:
receive a communication associated with a customer of the contact center;
analyze the communication to determine a relevancy associated with the communication;
tag the communication with a tag that identifies the determined relevancy;
update a priority associated with assigning the communication to an agent of the contact center based at least in part on the relevancy tag;
store the communication with the tag in a database of communications;
enable a machine learning process to analyze the database of communications; and
update a data model used to automatically tag communications with tags based on the analysis performed by the machine learning process.

30. The contact center of claim 29, wherein the communication is also stored with at least post-interaction data structure associated therewith.

31. The contact center of claim 29, wherein the communication comprises a text-based communication.

32. The contact center of claim 29, wherein the processor is further enabled to route the communication based on the determined relevancy associated with the communication.

33. The contact center of claim 29, wherein the communication comprises a voice communication.

* * * * *